United States Patent [19]
Spry

[11] Patent Number: 5,544,575
[45] Date of Patent: Aug. 13, 1996

[54] SHELLER FOR SEED CORN

[76] Inventor: Robert H. Spry, 21 Sunset Rd., Bloomington, Ill. 61701

[21] Appl. No.: 525,397

[22] Filed: Sep. 8, 1995

Related U.S. Application Data

[63] Continuation-in-part of Ser. No. 363,937, Dec. 27, 1994, Pat. No. 5,454,303.

[51] Int. Cl.$^6$ ............................ A01F 11/06; A01F 12/26
[52] U.S. Cl. .................. 99/628; 99/585; 99/623; 460/46; 460/58; 460/83; 460/133
[58] Field of Search ............................ 99/585, 623–629; 460/45, 46, 58, 62, 83, 109, 116, 133

[56] References Cited

U.S. PATENT DOCUMENTS

| | | | |
|---|---|---|---|
| 675,452 | 6/1901 | Stradley | 460/46 |
| 2,271,898 | 2/1942 | Mast | 460/46 |
| 2,594,995 | 4/1952 | Richmond | 99/585 |
| 3,348,780 | 10/1967 | Barkstrom et al. | 460/46 |
| 3,368,598 | 2/1968 | Nakano | 99/585 |
| 3,508,556 | 4/1970 | Kaminski | 460/58 |
| 4,389,927 | 6/1983 | Crompton | 99/628 |
| 4,532,940 | 8/1985 | Mitkov et al. | 460/46 |
| 4,708,056 | 11/1987 | Dinanath | 99/623 |
| 5,017,177 | 5/1991 | Mitkov et al. | 460/62 |
| 5,033,372 | 7/1991 | Silvestrini | 99/628 |
| 5,351,610 | 10/1994 | Jonsson | 99/628 |

*Primary Examiner*—Timothy F. Simone
*Attorney, Agent, or Firm*—Emrich & Dithmar

[57] ABSTRACT

Apparatus for shelling seed corn in a manner which minimizes damage to the individual kernels includes a generally closed housing open at the top to receive ears of corn and having lower apertures for discharging the corn cobs to waste and recovering the kernels extracted from the cobs. Disposed within the housing are a pair of vertically aligned arrays of rollers, with the pair of roller arrays horizontally spaced from one another. Ears of corn are deposited through a slot in an upper portion of the housing and pass between the two arrays of vertically aligned rollers. The horizontal spacing between adjacent, horizontally aligned rollers in the first and second arrays of rollers decreases in proceeding from top to bottom, with the spacing between the two uppermost rollers being such as to easily allow an ear of corn to pass therebetween and the spacing between the bottom pair of rollers being essentially equal to the diameter of a corn cob. The rollers in the first and second arrays are rotationally displaced in opposite directions and at different speeds so as to urge the ears of corn into the space between the two arrays in a downward direction. Each cylindrical roller is comprised of a compressible, resilient material such as rubber and has an irregular, rough-textured outer surface for aggressively engaging the ears of corn and removing the kernels therefrom.

19 Claims, 4 Drawing Sheets

SHELLER FOR SEED CORN

FIELD OF THE INVENTION

This application is a continuation-in-part of application Ser. No. 08/363,937 filed Dec. 27, 1994 now U.S. Pat. No. 5,454,303. This invention relates generally to the recovery of seed corn and is particularly directed to apparatus for shelling high moisture seed corn.

BACKGROUND OF THE INVENTION

An average of 75 to 80 million acres of commercial corn is planted annually in the United States. This requires on the order of 25 to 30 million bushels of seed corn to plant the crop. Hybrid seed corn is relatively expensive to develop, grow and harvest, being substantially more in cost per bushel than feed corn. Harvesting of the seed corn traditionally starts with the corn having an approximate physiological maturity of 35% moisture content. The seed is harvested on the ear mechanically and artificially dried in an ear corn dryer by forcing air heated to a temperature on the order of 90°–100° F. for a period of 70–80 hours. This provides ear corn having a moisture content on the order of 12½%. The ear corn is then passed through shellers which direct the ears between metal cylinders rotated at high speed and metal corrugated grates to remove the kernels from the cob. The metal surfaces cause damage to the seed which is typically a highly refined genotype which has been developed and harvested at great expense.

The time required to dry the corn crop from 35% to 12% moisture content is twice as long as the time required to dry from 35% to 25% moisture content, assuming a fixed, constant application of heat for moisture removal. Similarly, the fuel cost to dry the crop from 35% to 12½% is twice the cost as to dry the crop from 35% to 25% moisture content. It is, of course, highly desirable to reduce the time and amount of fuel required for drying the corn crop to the desired levels of moisture content. If the corn drier could be emptied when the seed corn is 25% moisture content, the drier could then be re-filled permitting the time required for crop harvest to be substantially reduced and perhaps cut in half. In addition, if the kernels could be removed from the high moisture content seed corn prior to the drying process, only the drying of the kernels would be required and drying of the unwanted cob would be avoided. Eliminating the requirement to dry the corn cob would also reduce the cost of the fuel required and the time involved in the drying process.

This invention addresses the aforementioned limitations of the prior art by providing apparatus for the shelling of high moisture content seed corn which removes the kernels from the cob for drying and not only shortens the drying period, but also reduces the amount of fuel required.

OBJECTS AND SUMMARY OF THE INVENTION

Accordingly, it is an object of the present invention to remove kernels from the ears of high moisture seed corn in a manner which minimizes damage to the kernels.

It is another object of the present invention to provide apparatus for shelling ears of high moisture seed corn which facilitates recovery of the kernels and disposal of the cobs and allows for subsequent drying of only the kernels for faster drying at reduced fuel costs.

This invention contemplates apparatus for shelling high moisture content ears of seed corn wherein kernels are removed from a cob of an ear of corn, the apparatus comprising: first and second pluralities of generally vertically aligned rollers, wherein the first and second pluralities of rollers are arranged in pairs of horizontally aligned rollers and wherein spacing between adjacent horizontally aligned pairs of rollers in the first and second pluralities of rollers decreases in proceeding from an upper pair of rollers to a lower pair of rollers, and wherein each roller includes a compressible, resilient, rough-textured outer portion; a first drive arrangement for rotationally displacing each of the first plurality of rollers at a first RPM and each of the second plurality of rollers at a second RPM, wherein the first and second pluralities of rollers are rotationally displaced in opposite directions in a manner so as to urge ears of corn deposited between the first and second pluralities of rollers in a downward direction toward the lower pair of rollers and wherein the ears of corn are engaged by the rollers for loosening and removing kernels from the cobs; a second drive arrangement coupled to the first plurality of rollers for displacing the first plurality of rollers relative to the second plurality of rollers in a reciprocating manner along the length of the rollers for orienting the cobs lengthwise horizontally along the length of the first and second pluralities of rollers whereby the cobs are rotationally displaced by engagement with the first and second pluralities of rollers for removing kernels about the entire periphery of the cob; and a separation arrangement disposed below the first and second pluralities of rollers for separating the cobs from the kernels removed from the cobs.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION OF THE PREFERRED EMBODIMENT

Figure 1:
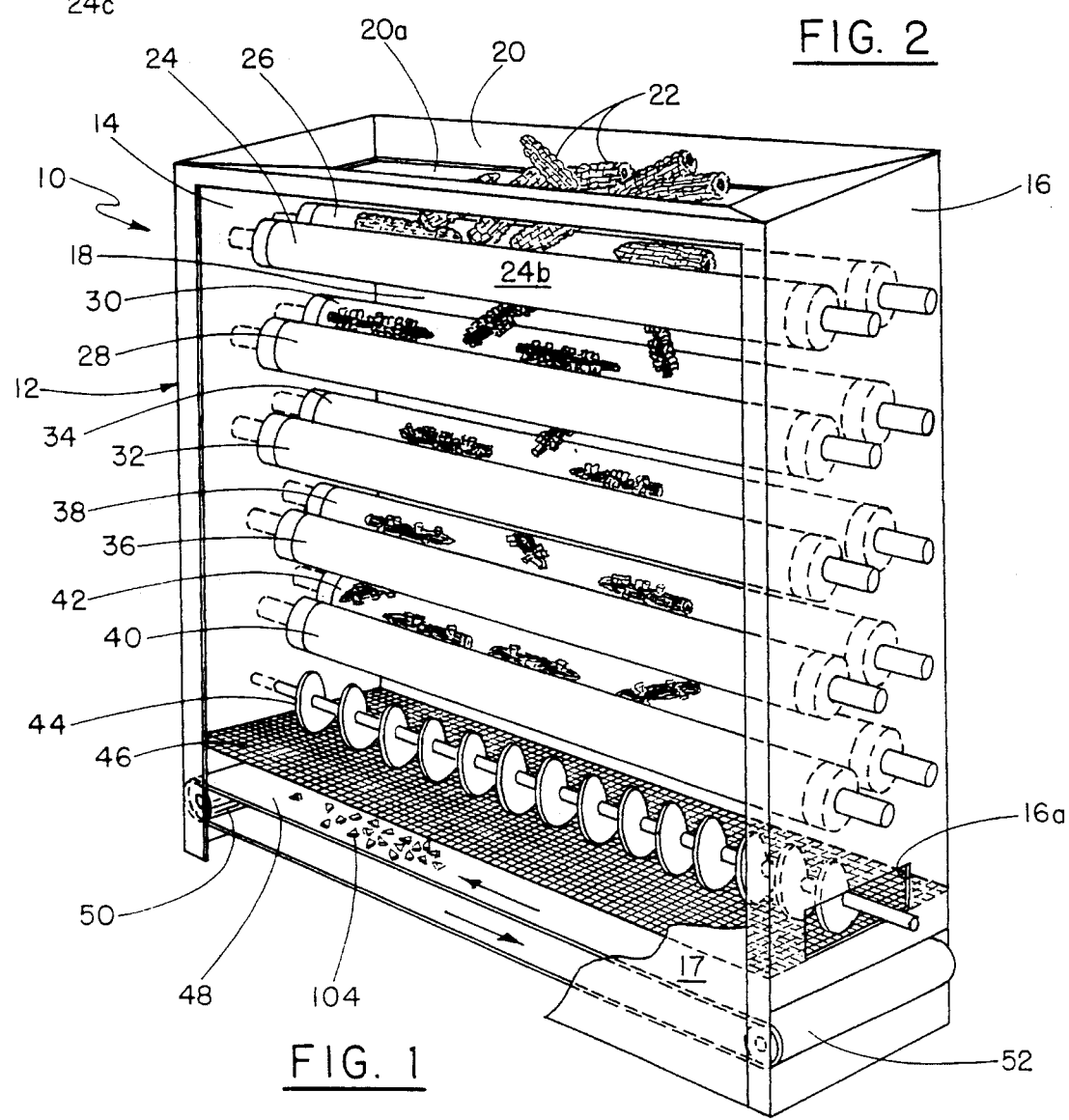
FIG. 1 is a partially cutaway perspective view shown partially in phantom of a sheller apparatus for seed corn in accordance with the present invention.
Figure 4:
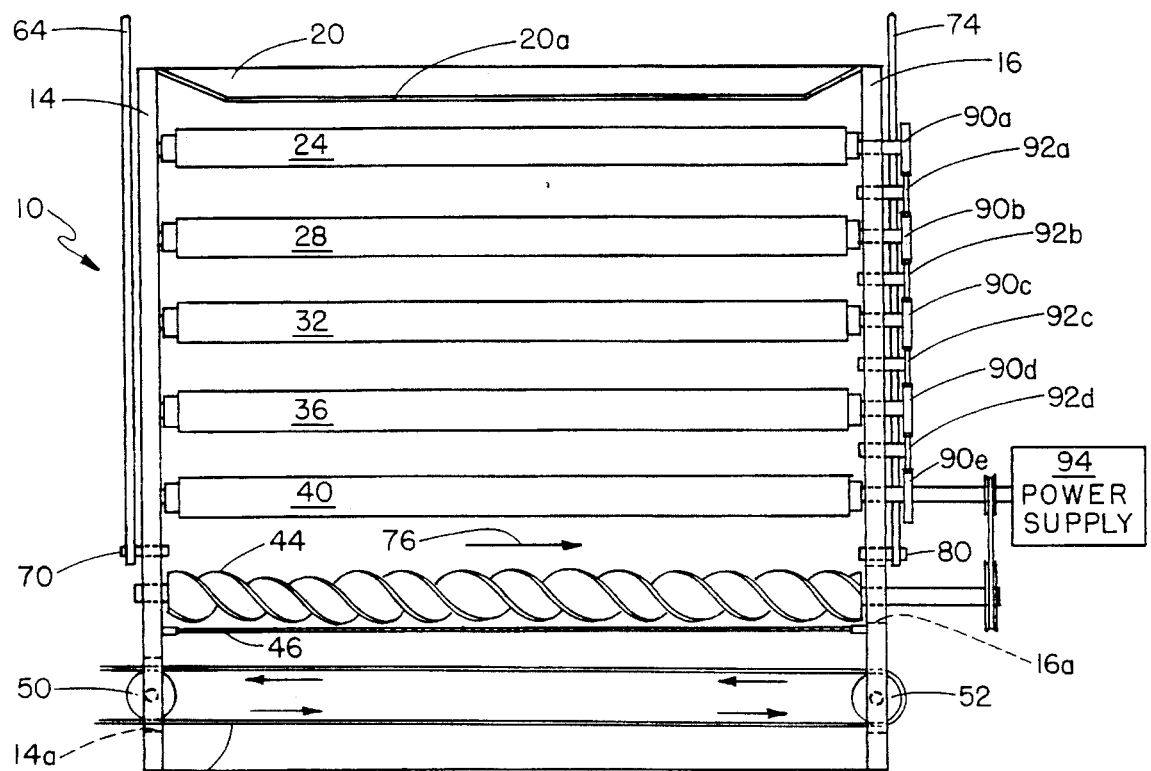
FIG. 4 is a front elevation view of the sheller for seed corn shown in FIG. 1 with the front panel removed for the purpose of illustrating the inner components of the sheller.
Figure 5:
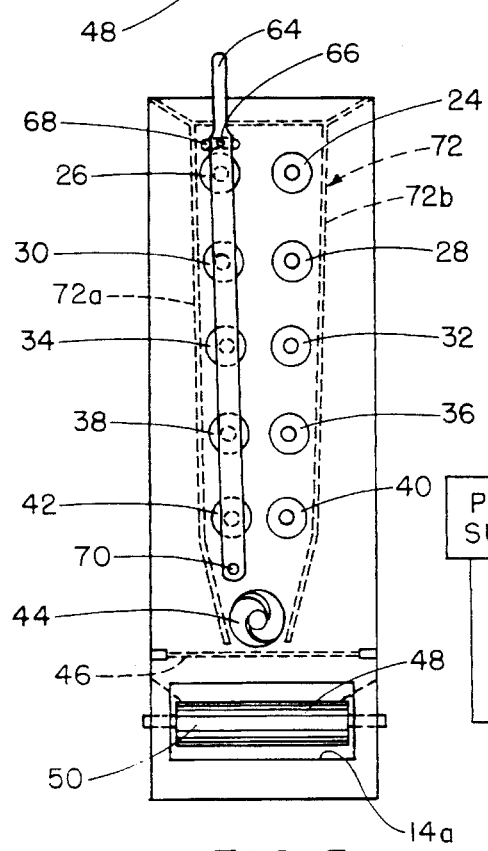
FIG. 5 is an elevation view of a first lateral portion of the inventive high moisture seed corn sheller shown in FIGS. 1 and 4.
Figure 6:
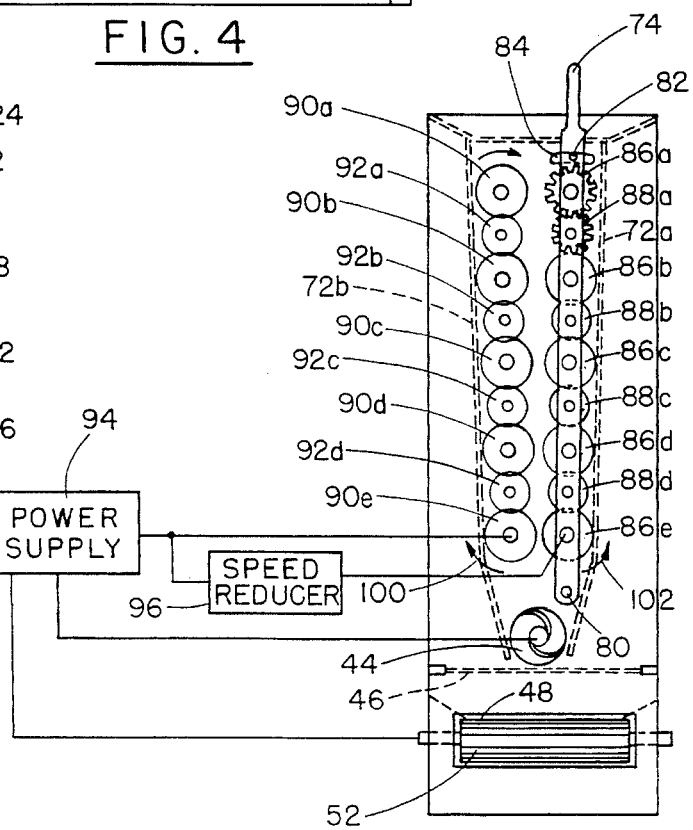
FIG. 6 is an elevation view of a second, opposed side from that shown in FIG. 5 of the inventive high moisture seed corn sheller also illustrating the drive inputs to the corn sheller.

Referring to FIG. 1, there is shown a perspective view of a sheller apparatus 10 for seed corn shown partially in phantom and partially cutaway. A front elevation view of the sheller apparatus 10 with its front panel removed for improved viewing is shown in FIG. 4, while FIGS. 5 and 6 are elevation views of respective, opposed lateral portions of the sheller apparatus.

The sheller apparatus 10 includes an upright, generally rectangular housing 12 having first and second sidewalls 14 and 16, an aft wall 18, and a front wall 17 shown partially cutaway in FIG. 1. Housing 12 further includes a top panel 20 which is inclined downwardly toward its center and includes an elongated slot 20a therein. Slot 20a is adapted to receive ears of corn 22 deposited on the top panel 20. The ears of corn 22 enter the housing 12 by means of the slot 20a in the top panel 20.

Disposed within the housing 12 are first and second pluralities of generally vertically aligned, spaced rollers, with the first and second pluralities of rollers arranged in a horizontally spaced manner relative to one another. The first plurality of rollers includes a top roller 24, intermediate rollers 28, 32, 36, and a bottom roller 40. Similarly, the second plurality of rollers includes a top roller 26, intermediate rollers 30, 34 and 38, and a bottom roller 42. While each of the first and second pluralities of rollers is shown as including five vertically aligned, spaced rollers, the present invention is not limited to the use of this number of rollers in each vertical array of rollers, but will operate equally as well with various numbers of vertically aligned rollers, such as four spaced, vertically aligned rollers in each of the pluralities of rollers.

Figure 3:
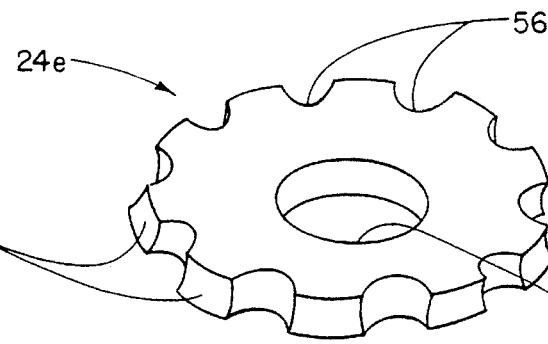
FIG. 3 is a perspective view of a disc-like element forming a portion of the corn sheller roller of FIG. 2.
Figure 2:
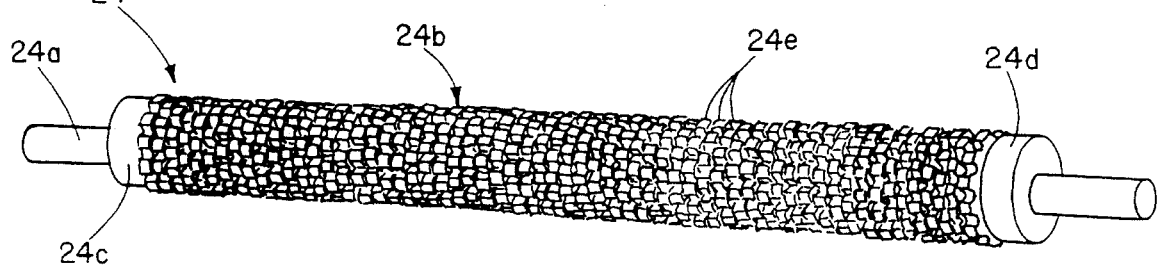
FIG. 2 is a perspective view of one of the rollers used in the corn shelling apparatus of FIG. 1 for engaging an ear of corn and removing the kernels therefrom.

Referring to FIG. 2, there is shown a perspective view of the top roller 24 within the first plurality of rollers. Each of the other rollers is identical in structure and operation to the first upper roller 24 shown in FIG. 2. Roller 24 includes an elongated, linear, inner shaft 24a and an outer portion comprised of a plurality of disc-like roller elements 24e arranged in a tight-fitting manner along the length of the shaft. FIG. 3 is a perspective view of roller element 24e which is adapted for secure positioning upon the shaft 24a in a press-fit manner. Roller element 24e includes a plurality of alternating projections 54 and recesses 56 disposed about the outer periphery thereof. Roller element 24e further includes a center, circular aperture 58 through which the shaft 24a is inserted. The alternating projections 54 and recesses 56 on each of the roller elements 24e provides the roller 24 with a rough textured outer surface for engaging the ears of corn 22 deposited through slot 20a into housing 12 and intermediate the first and second vertically aligned pluralities of rollers. Each of the roller elements 24e is preferably comprised of a flexible, compressible, resilient material such as rubber for aggressively engaging the ears of corn 22 and removing the kernels therefrom without damaging the individual kernels. In one embodiment, the roller elements 24a are fabricated from the side walls of rubber tires such as by stamping. As mentioned above, the roller elements 24e are press-fit onto the roller's shaft 24a and are securely maintained in position thereon by means of first and second end caps, or collars, 24c and 24d.

As shown in the side views of FIGS. 5 and 6, the first and second pluralities of generally vertically aligned rollers are arranged in a tapered configuration, with the spacing between the two top rollers 24 and 26 greater than the spacing between the two bottom rollers 40 and 42. The spacing between the rollers intermediate the top and bottom pairs of rollers decreases in proceeding downwardly as shown in the figures.

Attached to one end of each of the rollers is a respective drive gear as shown in FIGS. 4 and 6. Thus, drive gears 90a, 90b, 90c, 90d and 90e are respectively disposed on the ends of rollers 24, 28, 32, 36 and 40. Similarly, drive gears 86a, 86b, 86c, 86d and 86e are respectively disposed on the ends of rollers 26, 30, 34, 38 and 42. Disposed between adjacent pairs of vertically aligned drive gears is an idler gear. Thus, idler gears 88a, 88b, 88c and 88d are respectively disposed between and engage drive gears 86a and 86b; 86b and 86c; 86c and 86d; and 86d and 86e. Similarly, idler gears 92a, 92b, 92c and 92d are respectively disposed intermediate and engage respective pairs of vertically aligned adjacent drive gears as shown in FIG. 6. For simplicity, only the uppermost drive gear 86a and idler gear 88a in the second plurality of vertically aligned drive gears are shown in FIG. 6 as including a plurality of spaced teeth around the periphery thereof. It should be understood that all of the aforementioned drive gears and idler gears each include a plurality of spaced teeth around the respective peripheries thereof.

As shown in FIGS. 4 and 6, the bottom drive gear 90e in the first plurality of vertically aligned drive gears is coupled to and rotationally displaced in the direction of arrow 100 by means of a power supply, or input drive, 94. The idler gears coupling each pair of adjacent drive gears allow for rotationally displacing each of the vertically aligned drive gears also in the direction of arrow 100 in response to rotational displacement of the bottom drive gear 90e. Similarly, the bottom drive gear 86e in the second plurality of vertically aligned drive gears is coupled to and rotationally displaced by means of a combination of power supply 94 and a speed reducer 96. Drive gear 86e as well as the remaining drive gears in the second plurality of drive gears is displaced in the direction of arrow 102. Each roller in the first plurality of rollers coupled to drive gears 90a–90e is similarly rotationally displaced in the direction of arrow 100. Likewise, each roller coupled to a respective one of the drive gears 86a–86e is rotationally displaced in the direction of arrow 102. The ears of corn deposited through the slot 20a in the housing's top panel 20 are urged downward between the first and second pluralities of rollers by virtue of the rotational displacement of these rollers. The first plurality of rollers is thus rotated in a first direction as shown by arrow 100, while the second plurality of rollers is rotationally displaced in a second, opposite direction as shown by the direction of arrow 102 in FIG. 6. The ears of corn thus travel downwardly between the first and second vertically aligned pluralities of rollers. Spaced inner walls 72a and 72b shown in dotted line form in FIGS. 5 and 6 guide the downwardly travelling ears of corn and prevent them from escaping from in between the first and second pluralities of vertically aligned rollers. The first and second inner walls 72a and 72b form an inner housing 72 which is open and tapered inwardly at its lower end. Disposed in the open lower end of inner housing 72 is an auger 44. In one embodiment, one set of vertically aligned rollers is driven at a speed of 300 RPM, while the second plurality of vertically aligned rollers is rotationally displaced at a speed of 200 RPM. The power supply 94 and speed reducer 96 may be conventional in design and operation for rotationally driving the bottom gear and roller combinations. The power supply 94 may also be used to rotationally displace the auger 44 for the removal of corn cobs from the apparatus housing 12 as shown in FIG. 6. The power supply may also be used to drive the conveyor 48 via the second roller 52 also as shown in FIG. 6.

Disposed below the auger 44 is a screen 46 having a plurality of apertures therein for passing the kernels removed from the ears of corn which travel down between the first and second pluralities of vertically aligned rollers. In a preferred embodiment, the apertures within the screen 46 are on the order of ½ in diameter The kernels transit the screen 46 and are deposited upon a conveyor 48 such as of the endless belt type for removal of the kernels from the housing 12. Rotational displacement of the auger 44 by means of the power supply 94 allows for removal of the corn cobs deposited on screen 46 in the direction of arrow 76 through an aperture 16a in a lower portion of housing 12. The kernels 104 removed from the cobs are similarly removed by means of the conveyor 48 through a second aperture 14a in a lower portion of housing 12.

The spacing between the first and second pluralities of vertically aligned rollers is adjustable to accommodate corn genotypes of different size. Typically in shelling a seed corn, each of the ears of corn will be of a common genotype and of essentially the same size. The present invention allows for adjustment of the spacing between the first and second vertically aligned pluralities of rollers to accommodate a range of genotype sizes. As shown in FIG. 5, one end of each of the rollers 26, 30, 34, 38 and 42 is attached to a first control handle 64. A lower end of control handle 64 is mounted to the first side wall of housing 12 by means of a pivot pin 70. An upper end of the first control handle 64 is provided with an alignment pin 66 inserted through a slot 68 in the housing's first sidewall 14 which is not shown in FIG. 5 for simplicity. A second end of each of the rollers in the first plurality of vertically aligned rollers is rotationally coupled to a second control handle 74 as shown in FIGS. 4 and 6. As in the case of the first control handle 64, the second control handle 74 is pivotally coupled to the housing's second sidewall 16 by means of a pivot pin 80 inserted through a lower end of the handle. Inserted through an upper portion of the second control handle 74 is an alignment pin 82 which, in turn, is inserted through a slot in the housing's second sidewall 16. Manually displacing the first and second control handles 64, 74 about their respective pivot pins permits the first plurality of vertically aligned rollers to be displaced either toward or away from the second plurality of vertically aligned rollers in adjusting the inter-roller spacing depending upon the size of the ears of corn being processed by the sheller apparatus 10 of the present invention. Depending upon the genotype of the ears of corn being processed, the first and second upper rollers 24 and 26 will typically be positioned between 1½" to 2" apart, while the spacing between the first and second lower rollers 40 and 42 will typically be on the order of 1" or less. The individual rollers are typically on the order of 48" long and have an outer diameter of approximately 3". The roller elements, such as element 24e as shown in FIG. 3, in one embodiment are provided with notches of from ¼" to ⅜" in depth for aggressively contacting the ears of corn which pass between the vertical arrays of rotating rollers. The vertical spacing between adjacent pairs of rollers in each of the vertically aligned arrays of rollers is typically on the order of 4".

Figure 7:
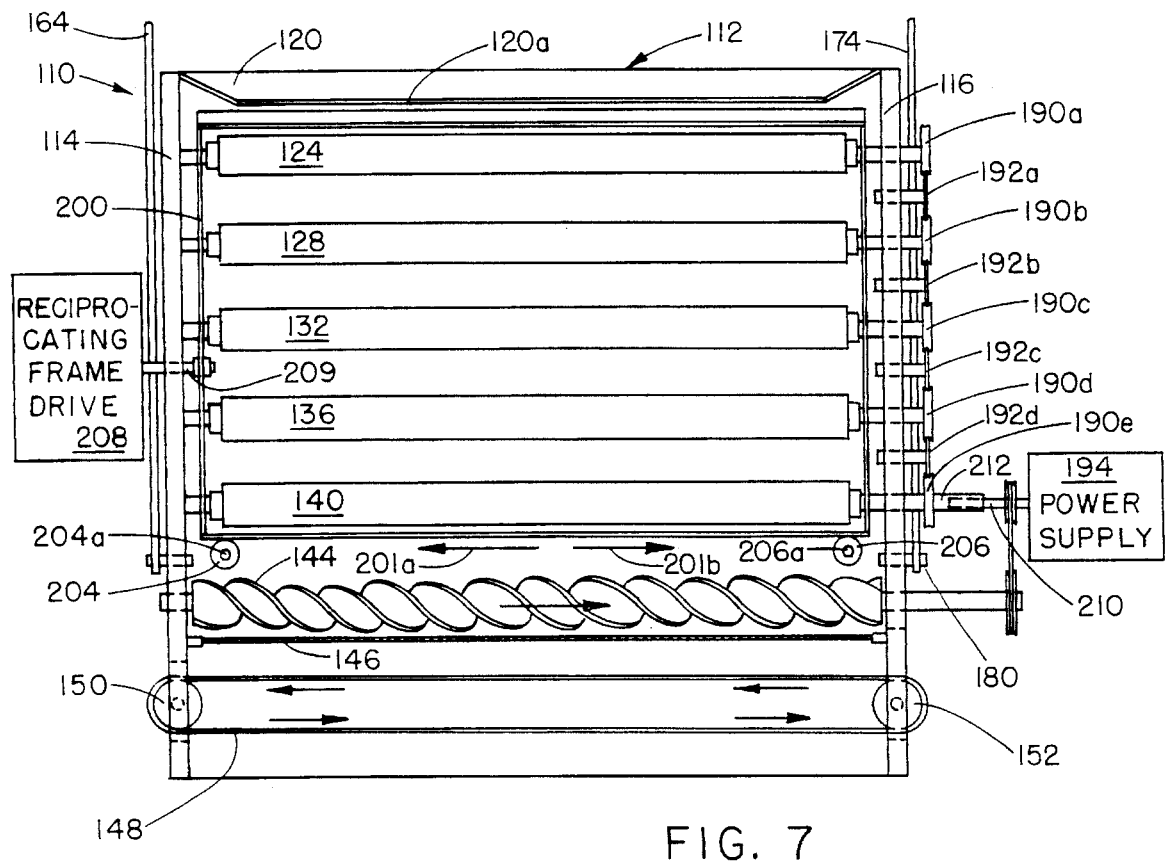
FIG. 7 is a front elevation view of a sheller for seed corn in accordance with another embodiment of the invention, with the front panel removed for the purpose of illustrating the inner components of the sheller.
Figure 8:
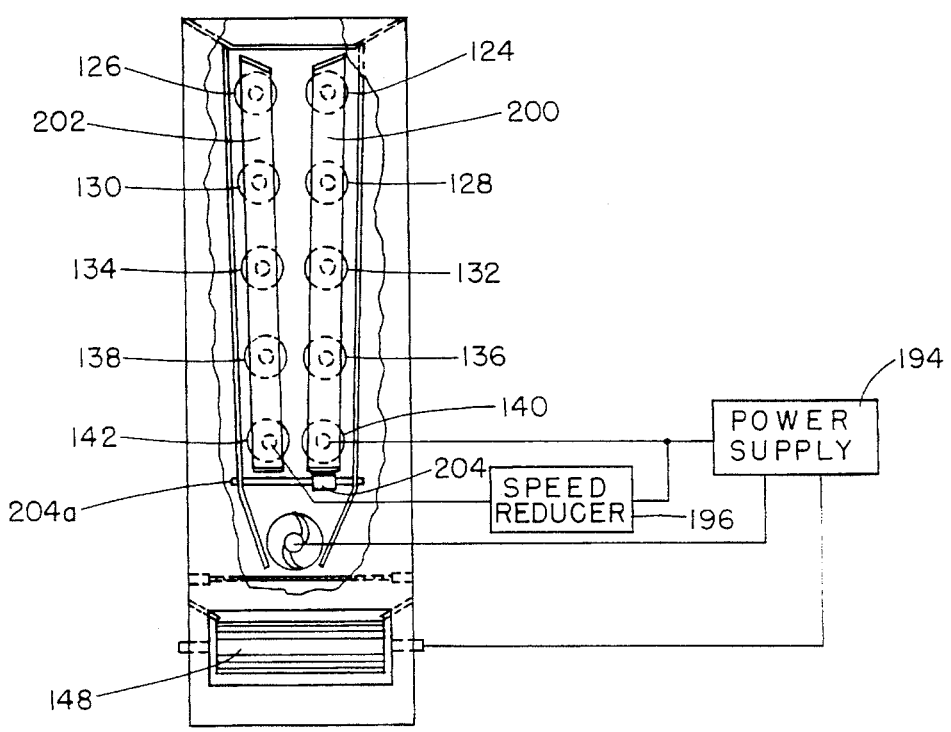
FIG. 8 is a side elevation view of the sheller for seed corn shown in FIG. 7 with a side wall of the sheller housing partially cut away for the purpose of illustrating the inner components of the sheller.
Figure 9:
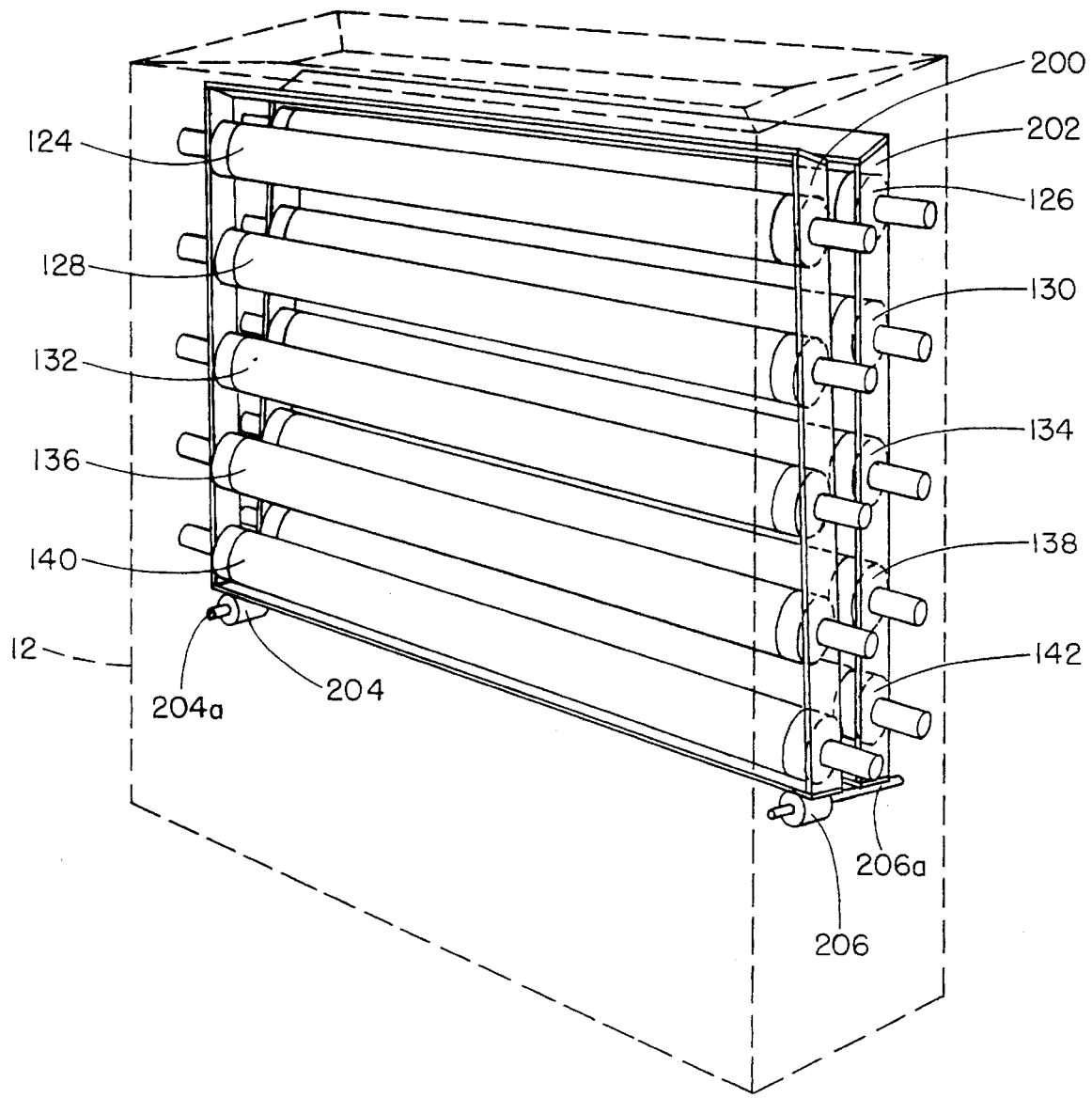
FIG. 9 is a partial perspective view shown partially in phantom of the sheller for seed corn shown in FIGS. 7 and 8.

In accordance with another aspect of the present invention, a second embodiment of the inventive sheller for seed corn 110 is shown in front elevation view in FIG. 7 where the front panel has been removed for the purpose of illustrating the inner components of the sheller. A partially cutaway side elevation view of the sheller for seed corn 110 shown in FIG. 7 is illustrated in FIG. 8, while a partial perspective shown partially in phantom of the sheller is shown in FIG. 9.

As in the previously described embodiment, the sheller apparatus 110 includes an upright, generally rectangular housing 112 with first and second Side walls 114, 116 and front and aft walls. Housing 112 further includes a top panel 120 which is inclined downwardly toward its center and includes an elongated slot 120a therein. Disposed within housing 112 are first and second pluralities of generally vertically aligned, spaced rollers, with the first and second pluralities of rollers arranged in a horizontally spaced manner relative to one another. The first plurality of rollers includes a top roller 124, intermediate rollers 128, 132 and 136, and a bottom roller 140. Similarly, the second plurality of rollers includes a top roller 126, intermediate rollers 130, 134 and 138, and a bottom roller 142. As in the previously described embodiment, each of the rollers is identical in structure and operation and includes a respective elongated, linear, inner shaft and an outer portion comprised of a plurality of disc-like roller elements arranged in a tight-fitting manner along the length of the shaft. Also as previously described and as shown in FIG. 3, each disc-like roller element includes a center, circular aperture and a plurality of alternating projections and recesses about the outer periphery thereof.

Attached to one end of each of the rollers is a respective drive gear as shown in FIG. 7. Thus, drive gears 190a, 190b, 190c, 190d and 190e are respectively disposed on the ends of rollers 124, 128, 132, 136 and 140. Similarly, a drive gear is disposed on the end of each of the second set of rollers 126, 130, 134, 138 and 142, although this is not shown in the figures for simplicity. Disposed between adjacent pairs of vertically aligned drive gears is an idler gear. Thus idler gears 192a, 192b, 192c and 192d are respectively disposed intermediate and engage respective pairs of vertically aligned adjacent drive gears as shown in FIG. 7. A corresponding set of idler gears are coupled to the drive gears on the ends of each of the second set of rollers 126, 130, 134, 138 and 142, although this is not shown in the figures for simplicity. It should be understood that all of the aforementioned drive and idler gears each include a plurality of spaced teeth around the respective peripheries thereof.

As shown in FIG. 7, the bottom drive gear 190e in the first plurality of vertically aligned drive gears is coupled to and rotationally displaced by means of a power supply, or input drive, 194. The idler gears coupling each pair of adjacent drive gears allow for rotationally displacing each of the vertically aligned drive gears in response to rotational displacement of the bottom drive gear 190e. Power supply 194 is similarly coupled to and rotationally displaces the bottom roller 142 in the second set of rollers as shown in FIG. 8. A speed reducer 196 couples the power supply 194 to the second set of rollers as shown in FIG. 8 to permit each set of rollers to be rotated at a different speed as previously described. Power supply 194 is further coupled to and rotationally displaces an auger 144 as well as the combination of first and second rollers 150, 152 and a conveyor 148 as in the previously described embodiment. A screen 146 is disposed in a lower portion of the outer housing 112 of the sheller 110 also as in the previously described embodiment. Finally, first and second control handles 164 and 174 connected to one set of rollers allow for adjustment of the spacing between the first and second vertically aligned pluralities of rollers to accommodate a range of genotype sizes as in the previously described embodiment.

In accordance with this embodiment of the present invention, provision is made for displacing the first set of vertically aligned rollers in a reciprocating manner and in a direction parallel to the longitudinal axes of the rollers. Thus, the first set of rollers 124, 128, 132, 126 and 140 are mounted to a first generally rectangular roller support frame 200. Similarly, the second set of rollers 126, 130, 134, 138 and 142 are attached to and supported by a generally rectangular second roller support frame 202. Each of the rollers is freely rotatable within its respective support frame and the forward and aft portions of each of the roller frames 200, 202 are open. A reciprocating frame drive 208 is coupled to the first roller support frame 200 by conventional means such as a connecting rod 209. The first roller support frame 200 is positioned upon and supported by first and second rollers 204 and 206. The first and second rollers 204, 206 are, in turn, respectively coupled to and supported by first and second support shafts 204a and 206a. The first and second support shafts 204a. 206b may be attached to the rectangular outer housing 112 of the sheller 110 for support, although this is not shown in the figures for simplicity.

Reciprocating frame drive 208 displaces the first roller support frame 200 and the first set of rollers attached thereto in a reciprocating manner in the direction of arrows 201a and 201b as shown in FIG. 7. The reciprocating action of the first roller support frame 200 and the first set of rollers attached thereto relative to the fixed second set of rollers causes a corn cob travelling downward between the two sets of rollers which is oriented lengthwise in a vertical direction to be rotationally displaced about a horizontal axes so as to become aligned lengthwise parallel to the longitudinal axes of the rollers. This prevents a corn cob from transiting in between the two sets of rollers in a fixed orientation with its longitudinal axis oriented generally vertically resulting in removal of only those kernels on opposing sides of the cob. The reciprocating action of the first roller support frame 200 and rollers attached thereto in ensuring that all corn cobs transiting between the two sets of rollers have their longitudinal axis aligned generally parallel to the longitudinal axes of the rollers causes each corn cob to be rotationally displaced as it is engaged by the rollers to ensure that kernels are removed from around the entire lateral periphery of the cob. Thus, the advantage of this embodiment of the invention is that it ensures that all corn cobs passing through the sheller 110 are aligned generally parallel with the two sets of rollers engaging the cobs which allows for the removal of kernels disposed about the entire periphery of the cob by the cob engaging rollers.

In this latter embodiment, the various shafts supporting drive gears 190a–190e and idler gears 192a–192d are inserted through apertures within side wall 116 of the sheller's outer housing 112 in a manner which permits not only rotation of these support shafts, but also linear displacement of the shaft through the side wall in a direction generally parallel to the length of the support shaft. This allows for the inward and outward movement of each of the support shafts for each of the drive and idler gears coupled to the first set of rollers in the first roller support frame 200 for accommodating the reciprocating displacement of the first roller support frame within the sheller's outer housing 112. In addition, a telescoping drive linkage including a first inner drive shaft 210 and a second outer drive shaft 212 connects the power supply 194 to the bottom drive gear 190e and the first lower roller 140 to accommodate the reciprocating, linear displacement of the first roller support frame 200 within the sheller's outer housing 112. In this latter embodiment, the second roller support frame 202 is maintained in fixed position within the sheller's outer housing 112 as in the previously described embodiment. In the preferred embodiment, the first roller support frame 200 and the first set of rollers is displaced in a reciprocating manner a distance of 1½" relative to the second roller support frame 202 and the second set of rollers. During the typical course of travel of a corn cob between the first and second sets of rollers, the first set of rollers will be displaced 1½" four times to ensure that all corn cobs have their longitudinal axes aligned generally horizontally before exiting from in between the two lowermost rollers to ensure that kernels are removed around the entire periphery of the cob.

There has thus been shown a sheller for high moisture seed corn which includes a generally closed housing open at the top for receiving ears of corn. Disposed in the housing are first and second pluralities of generally vertically aligned rollers between which the ears of corn are deposited. The spacing between horizontally aligned, adjacent pairs of rollers in each of the first and second pluralities of rollers decreases in proceeding from a pair of upper rollers to a pair of lower rollers. Each of the rollers is provided with a rough-textured, compressible and resilient outer surface for aggressively engaging the ears of corn and removing the kernels without damaging the kernels. The first plurality of vertically aligned rollers are rotationally driven at a first RPM, while the second plurality of vertically aligned rollers are driven at a different RPM, with the uppermost rollers initially loosening the kernels and the lower rollers more aggressively engaging the ears of corn to remove the kernels therefrom. Each vertical array of rollers typically includes four or five rollers, with the rough-textured outer surface of the roller provided by a plurality of disc-like, notched roller elements formed by stamping the sidewalls of old tire casings and press-fitting each of the roller elements onto a 1" shaft. Disposed in a lower portion of the housing below the rollers is the combination of a screen for passing the kernels and supporting the corn cobs and a rotating auger for removing the cobs. A conveyor in the form of an endless belt disposed below the apertured screen removes the kernels from the housing. The first and second pluralities of vertically aligned rollers are rotationally displaced in opposite directions so as to urge the ears of corn in a downward direction between the first and second pluralities of rollers which are driven by a gear and cog combination attached to one end of each of the rollers. The spacing between the first and second pluralities of rollers may be adjusted to accommodate a range of sizes of the ears of corn depending upon genotype. In the preferred embodiment, the first set of rollers are displaced in a reciprocating manner along their longitudinal axes while the second set of rollers are maintained in fixed position. The reciprocating relative motion of the rotating rollers as they engage the corn cobs forces each cob to become aligned lengthwise with the longitudinal axes of the rollers. This causes each cob to be rotated about its longitudinal axis as it is engaged and travels downwardly between adjacent rollers ensuring that kernels disposed about the entire periphery of the cob are removed therefrom.

While particular embodiments of the present invention have been shown and described, it will be obvious to those skilled in the art that changes and modifications may be made without departing from the invention in its broader aspects. For example, while only a single corn sheller has been described herein, this invention contemplates employing two or more of the inventive corn shellers in a side-byside arrangement for increasing the amount of corn shelled. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. Apparatus for shelling high moisture content ears of seed corn wherein kernels are removed from a cob of an ear of corn, said apparatus comprising:

first and second pluralities of generally vertically aligned rollers, wherein said first and second pluralities of rollers are arranged in pairs of horizontally aligned rollers and wherein spacing between adjacent horizontally aligned pairs of rollers in said first and second pluralities of rollers decreases in proceeding from an upper pair of rollers to a lower pair of rollers, and wherein each roller includes a compressible, resilient, rough-textured outer portion;

first drive means for rotationally displacing each of said first plurality of rollers at a first RPM and each of said second plurality of rollers at a second RPM, wherein said first and second pluralities of rollers are rotationally displaced in opposite directions in a manner so as to urge ears of corn deposited between said first and second pluralities of rollers in a downward direction toward said lower pair of rollers and wherein the ears of corn are engaged by said rollers for loosening and removing kernels from the cobs;

second drive means coupled to said first plurality of rollers for displacing said first plurality of rollers relative to said second plurality of rollers in a reciprocating manner along the lengths of said first plurality of rollers for orienting the cobs lengthwise horizontally along the lengths of said first and second pluralities of rollers whereby the cobs are rotationally displaced by engagement with said first and second pluralities of rollers for removing kernels about the entire periphery of the cob; and means disposed below said first and second pluralities of rollers for separating the cobs from the kernels removed from the cobs.

2. The apparatus of claim 1 further comprising a moveable support frame coupled to said first plurality of rollers and further connected to said second drive means.

3. The apparatus of claim 2 further comprising a plurality of support rollers coupled to said moveable support frame for allowing for reciprocating displacement of said support frame and said first plurality of rollers coupled thereto by said second drive means.

4. The apparatus of claim 3 further comprising telescoping linkage coupling said first drive means to said first plurality of rollers to allow for reciprocating displacement of said moveable support frame and said first plurality of rollers.

5. The apparatus of claim 1 wherein said second drive means displaces said first plurality of rollers in a reciprocating manner over a distance on the order of 1½".

6. The apparatus of claim 1 wherein the horizontal spacing between said upper pair of rollers is greater than the diameter of the cobs and the horizontal spacing between said lower pair of rollers is substantially equal to the diameter of the cobs.

7. The apparatus of claim 6 wherein the horizontal spacing between said upper pair of rollers is in the range of 1½' to 2" and the horizontal spacing between said lower pair of rollers is 1" or less.

8. The apparatus of claim 1 wherein each of said rollers includes an elongated, linear inner shaft, and wherein the outer portion of the roller is disposed on said shaft and includes a plurality of alternating recesses and projections disposed about the outer periphery thereof.

9. The apparatus of claim 8 wherein the outer portion of a roller includes a plurality of disc-shaped elements each having an inner aperture through which said shaft is inserted in a press-fit manner.

10. The apparatus of claim 9 wherein each of said elements is comprised of rubber.

11. The apparatus of claim 1 wherein each of said first and second pluralities of rollers includes four or five vertically aligned rollers.

12. The apparatus of claim 1 wherein said means for separating the cobs from the kernels includes an apertured screen disposed below said rollers for retaining the cobs while allowing the kernels to drop through.

13. The apparatus of claim 12 wherein said means for separating the cobs from the kernels further includes a rotating auger disposed adjacent to and above said screen for removing the cobs retained by the screen.

14. The apparatus of claim 13 wherein said means for separating the cobs from the kernels further includes a conveyor disposed below said screen for catching and removing the kernels.

15. The apparatus of claim 1 further comprising means for changing the horizontal spacing between said first and second pluralities of rollers to accommodate cobs of different sizes.

16. The apparatus of claim 15 wherein said means for changing the horizontal spacing between said first and second pluralities of rollers includes first and second movable support handles each coupled to the respective ends of each of said first plurality of rollers.

17. The apparatus of claim 1 wherein said first drive means includes a power source coupled to said rollers.

18. The apparatus of claim 17 wherein said first drive means further includes a speed reducer coupled between said drive means and one of said pluralities of rollers.

19. The apparatus of claim 17 wherein said first drive means further includes first and second pluralities of drive gears respectively coupled to adjacent ends of said first and second pluralities of rollers.

* * * * *

UNITED STATES PATENT AND TRADEMARK OFFICE
CERTIFICATE OF CORRECTION

PATENT NO. : 5,544,575
DATED : Aug. 13, 1996
INVENTOR(S) : Robert H. Spry

It is certified that error appears in the above-indentified patent and that said Letters Patent is hereby corrected as shown below:

Column 1, line 31, "12%" should read -- 12-1/2% --.

Column 5, line 13, "1/2 in diameter" should read
              -- 1/2" in diameter. --

Column 7, line 22, "204a. 206b" should read
              -- 204a, 206a --.

Signed and Sealed this

Fifth Day of November, 1996

*Attest:*

BRUCE LEHMAN

*Attesting Officer*     *Commissioner of Patents and Trademarks*